J. D. SHOW.
SHOCK ABSORBER.
APPLICATION FILED MAR. 26, 1913.
1,095,936.
Patented May 5, 1914.
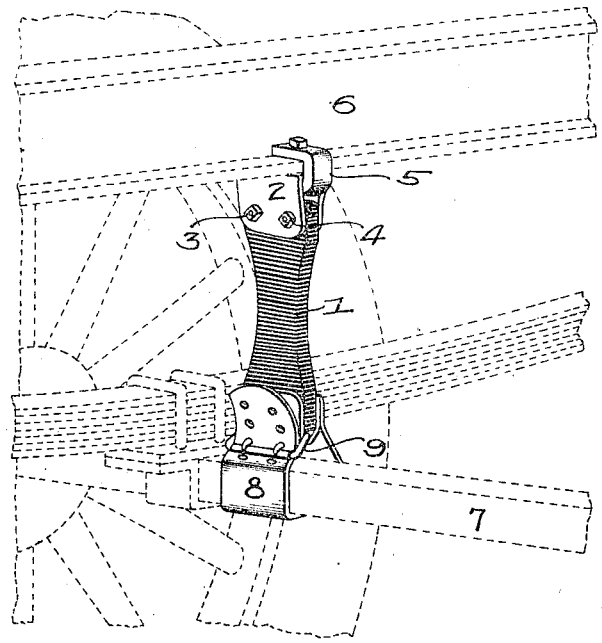
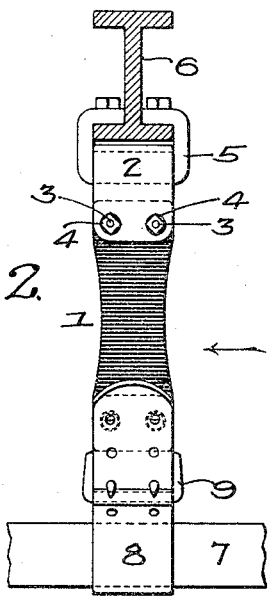
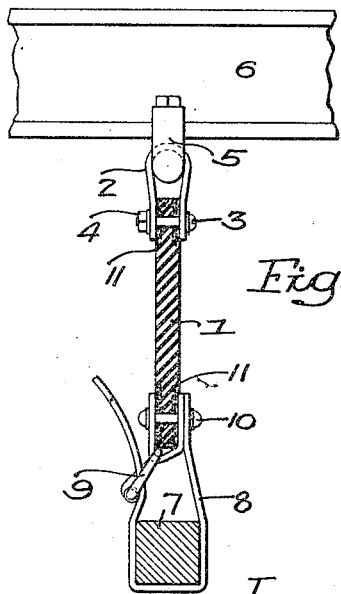
Inventor
John D. Show.

UNITED STATES PATENT OFFICE.

JOHN D. SNOW, OF PHILADELPHIA, PENNSYLVANIA, ASSIGNOR OF ONE-HALF TO WILLIAM C. EHRENFELD, OF TRENTON, NEW JERSEY.

SHOCK-ABSORBER.

1,095,936.

Specification of Letters Patent.

Patented May 5, 1914.

Application filed March 26, 1913. Serial No. 756,982.

*To all whom it may concern:*

Be it known that I, JOHN D. SNOW, a citizen of the United States, residing in Philadelphia, Pennsylvania, have invented certain Improvements in Shock-Absorbers, of which the following is a specification.

My invention relates to resilient means employed as cushion checks or shock absorbers for automobiles; and the object of my invention is to provide simple and efficient means readily applicable to automobiles and other structures, which shock absorbing means will not offer any resistance to the movement of the body in its downward movement or thrust and therefore will not affect the resiliency or value of the springs usually employed, but will take up the shock or thrust of the body in case of any unusual movement thereof in an upward direction, thereby preventing the breaking or damaging of the springs or other disarrangement of any part of the structure which often occurs in vehicles of this class as ordinarily constructed and mounted.

A further object of my invention is to provide a shock absorbing device readily applicable to any form of automobile or similar vehicle without affecting the design or changing the construction thereof, and without the necessity of employing a multiplicity of attaching or connecting members.

These and other features of my invention are more fully described hereinafter, reference being had to the accompanying drawings forming part thereof, in which:

Figure 1, is a perspective view of the shock absorbing device forming the subject of my invention, showing the same in its relative position with respect to the chassis or frame and the axle of an automobile; such parts being shown by dotted lines; Fig. 2, is a front elevation of the device, and Fig. 3, is an elevation looking in the direction of the arrow, Fig. 2.

Although I have only shown a single shock absorbing element in the drawings, it will be understood, of course, that the device is applied adjacent the four wheels of an automobile or similar structure to take care of shocks at various points, and, if desired, for any reason whatsoever, more than four shock absorbers may be employed.

I propose to employ as the shock absorbing medium or element of my improved device, a block or strip of rubber relatively pure and having a high degree of resiliency. The body of this rubber block or strip is preferably free from any canvas covering or body which might in any sense be termed a reinforcement, and it is so connected to the chassis and axle as to be free to yield when the body of the car springs upwardly from any cause.

In the drawings, 1 represents the strip or block of rubber, which may carry at its upper end a connecting band or member which may be of leather or other suitable material shown at 2, which is preferably secured to the block of rubber by bolts 3 and nuts 4, and this band 2 may pass over a bracket 5, which may be suitably connected to the side frame 6 of the chassis; or it may pass over the chassis frame.

At the lower end, the block or strip of rubber is connected to the axle 7 of the vehicle by means of a strap 8 secured to one side of the strip of rubber; the free end of which strap is retained by a buckle 9 secured to the other side of the rubber block, and said buckle may be retained in place by a strip of material similar to that forming the strap, or any other suitable material, which means, together with the strap, may be retained to the rubber strip or block by rivets 10 or any other suitable fastening means. The strap may be of any suitable length in order to afford proper attachment to an axle, and by preference, the strip or block of rubber is hollowed slightly at the sides, as clearly shown in the drawings.

The block or strip of rubber is preferably covered at its ends where it is joined to the connecting members by suitable fabric, indicated at 11, which gives additional strength and reinforces the same where it is apertured for the connecting attachments; band 2, strap 8, and buckle 9.

I use a high grade material, and the range of movement or stretch of the rubber is substantially unlimited.

I do not wish to be limited to the use of a bracket carried by the chassis frame, as in some instances I may employ a strap connection passing around the frame which will avoid the necessity of employing said bracket, and in other instances, the upper band or connecting member may be attached directly to the body of the car.

In practice, the device is adjacent the four main springs of the automobile, and the block or strip of rubber is placed under tension; the strap 8 being pulled to the greatest possible extent to accomplish this result.

By the use of a rubber shock absorber such as I have devised, the wear and tear on the tires due to excessive upward jolting of the car is entirely eliminated, and in addition such jolting is absolutely avoided; the rubber affording a cushioning effect not possible with the use of metal springs or other forms of shock absorbers.

I claim:

1. The combination with a vehicle frame and an axle thereof, of a shock absorber comprising a solid block of resilient material having reinforced ends, means for connecting one end of the block of resilient material to the frame or body of the vehicle, such means including a bracket carried by said frame and a strap or band permanently connected to the block of resilient material and in engagement with said bracket, and a strap and buckle secured to the opposite end of said shock absorber for adjustably connecting the same with said axle.

2. The combination with a vehicle frame and an axle thereof, of a shock absorber comprising a solid block of resilient material having ends reinforced by layers of fabric embedded therein, a bracket carried by the frame, a strap in engagement with said bracket and permanently secured to one end of said resilient block, and an adjustable connection for the opposite end of said block passing around the axle.

3. A shock absorber to prevent the rebound of vehicle bodies interposed between such body and an axle of the running gear thereof, said shock absorber comprising a solid block of resilient material adjustably connected to said parts, said block of material having a greater length than width, being substantially oblong in cross section and having its longitudinal sides concaved.

In testimony whereof, I have signed my name to this specification, in the presence of two subscribing witnesses.

JOHN D. SHOW.

Witnesses:
 MURRAY C. BOYER,
 WM. A. BARR.